United States Patent [19]

Burke

[11] Patent Number: 5,681,122
[45] Date of Patent: Oct. 28, 1997

[54] FLUID ISOLATION AND DISPERSION SYSTEM FOR TACTILE INPUT DEVICES

[75] Inventor: Randal A. Burke, Grays Lake, Ill.

[73] Assignee: NCR Corporation, Dayton, Ohio

[21] Appl. No.: 602,480

[22] Filed: Feb. 20, 1996

[51] Int. Cl.$^6$ .................................................. B41J 5/10
[52] U.S. Cl. ........................................ 400/472; 200/302.2
[58] Field of Search .................................. 400/490, 472; 361/680; 345/168; 200/302.1, 302.2; D14/115

[56] References Cited

U.S. PATENT DOCUMENTS

| | | | |
|---|---|---|---|
| 1,677,268 | 7/1928 | Brown | 455/178.1 |
| 3,676,607 | 7/1972 | Nash et al. | 361/680 |
| 3,824,472 | 7/1974 | Engel et al. | 324/355 |
| 3,831,063 | 8/1974 | Keough | 317/101 D |
| 3,896,384 | 7/1975 | Henderson | 325/352 |
| 4,020,328 | 4/1977 | Bradam | 235/146 |
| 4,180,711 | 12/1979 | Hirata et al. | 200/5 A |
| 4,352,968 | 10/1982 | Pounds | 200/302.2 |
| 4,506,344 | 3/1985 | Hubbard | 364/900 |
| 4,509,210 | 4/1985 | Kohn | 455/349 |
| 4,625,275 | 11/1986 | Smith | 364/401 |
| 4,625,276 | 11/1986 | Benton et al. | 364/408 |
| 4,636,593 | 1/1987 | Novak et al. | 200/5 |
| 4,716,262 | 12/1987 | Morse | 200/302.1 |
| 4,758,714 | 7/1988 | Carlson et al. | 235/380 |
| 4,847,798 | 7/1989 | Kurashima | 364/708 |
| 4,853,676 | 8/1989 | Kitts | 340/543 |
| 4,856,088 | 8/1989 | Oliwa et al. | 455/349 |
| 4,933,988 | 6/1990 | Thibault | 455/349 |
| 4,945,443 | 7/1990 | DeBiasi et al. | 361/93 |
| 4,948,281 | 8/1990 | Werner | 400/472 |
| 4,980,522 | 12/1990 | Murakami et al. | 200/5 |
| 5,012,075 | 4/1991 | Hutchison et al. | 235/379 |
| 5,166,868 | 11/1992 | Stanton et al. | 361/422 |
| 5,172,805 | 12/1992 | Gumb | 200/302.2 |
| 5,175,873 | 12/1992 | Goldenberg et al. | 455/89 |
| 5,193,047 | 3/1993 | Barratt et al. | 361/212 |
| 5,202,825 | 4/1993 | Miller et al. | 364/405 |
| 5,203,021 | 4/1993 | Repplinger et al. | 455/90 |
| 5,219,067 | 6/1993 | Lima et al. | 200/302.2 |
| 5,258,592 | 11/1993 | Nishikawa et al. | 200/302.2 |
| 5,289,785 | 3/1994 | MacPherson et al. | 109/42 |
| 5,359,182 | 10/1994 | Schilling | 235/380 |
| 5,371,348 | 12/1994 | Kumar et al. | 235/472 |
| 5,373,458 | 12/1994 | Bishay et al. | 364/708.1 |
| 5,404,491 | 4/1995 | Huzenlaub et al. | 395/500 |
| 5,421,659 | 6/1995 | Liang | 400/472 |
| 5,516,996 | 5/1996 | Shin | 400/490 |
| 5,565,865 | 10/1996 | So | 400/490 |

FOREIGN PATENT DOCUMENTS

| | | | |
|---|---|---|---|
| 783141 | 4/1968 | Canada | 200/302.2 |
| 2046524 | 11/1980 | United Kingdom | 200/302.2 |

*Primary Examiner*—Edgar S. Burr
*Assistant Examiner*—Daniel J. Colilla
*Attorney, Agent, or Firm*—Paul W. Martin

[57] ABSTRACT

A fluid isolation and dispersion system which includes one or more sealing devices to minimize the chance of fluid damage to electronic components. The system includes seals between keys of a keypad and aperture walls in a cover member through which the keys protrude, and a number of chambers around the keys for trapping fluid that has passed through any one of the seals. The chambers are defined by chamber walls linking the aperture walls, and a gasket below the chamber walls. The system may additionally include a channel formed between a periphery wall around the aperture walls and a flexible periphery wall around the gasket for diverting fluid that has passed by any one of the chamber walls, and a spout on one side of the gasket for discharging the fluid from the channel.

4 Claims, 5 Drawing Sheets

FLUID ISOLATION AND DISPERSION SYSTEM FOR TACTILE INPUT DEVICES

BACKGROUND OF THE INVENTION

The present invention relates to keypads and other tactile input devices, and more specifically to a fluid isolation and dispersion system for tactile input devices.

Tactile input devices, such as keypads and keyboards, are easily damaged by fluids. Fluid spills are especially harmful to electronic components within multi-function terminal devices found in a retail environment. Such devices may include a keypad, a magnetic stripe reader, and wireless communication circuitry. A fluid spill on the keypad of such devices not only damages the keypad, but also the electronic processing and control circuit for the contained peripherals. Retail terminal devices are subject to damage from a wide range of fluids that come in contact with the keypad during cleaning and accidental spills.

Known methods of minimizing fluid penetration use single-stage chambering, which collects fluids in a single chamber. Repeated testing has shown that these methods are grossly inadequate at protecting electronic circuitry from damage after repeated exposure to cleaning and accidental spills.

Another method uses additional components, including a hot melt seal, however the additional components are costly and unreliable.

Therefore, it would be desirable to provide better system for isolating and dispersing fluids spilled on keypads and other tactile input devices away from electronic components.

SUMMARY OF THE INVENTION

In accordance with the teachings of the present invention a fluid isolation and dispersion system for tactile input devices is provided. The system includes one or more sealing devices to minimize the chance of fluid damage to electronic components. First, the system includes seals between keys of a keypad and aperture walls in a cover member through which the keys protrude. Second, the system includes a number of chambers around the keys for trapping fluid that has passed through any one of the seals. The chambers are defined by chamber walls linking the aperture walls, and a gasket below the chamber walls. Third, the system may additionally include a channel formed between a periphery wall around the aperture walls and a flexible periphery wall around the gasket for diverting fluid that has passed by any one of the chamber walls, and a spout on one side of the gasket for discharging the fluid from the channel.

It is accordingly an object of the present invention to provide a fluid isolation and dispersion system for tactile input devices.

It is another object of the present invention to provide a fluid isolation and dispersion system for tactile input devices that employs a plurality of chambers.

It is another object of the present invention to provide a fluid isolation and dispersion system for tactile input devices that employs a channel to discharge fluid.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
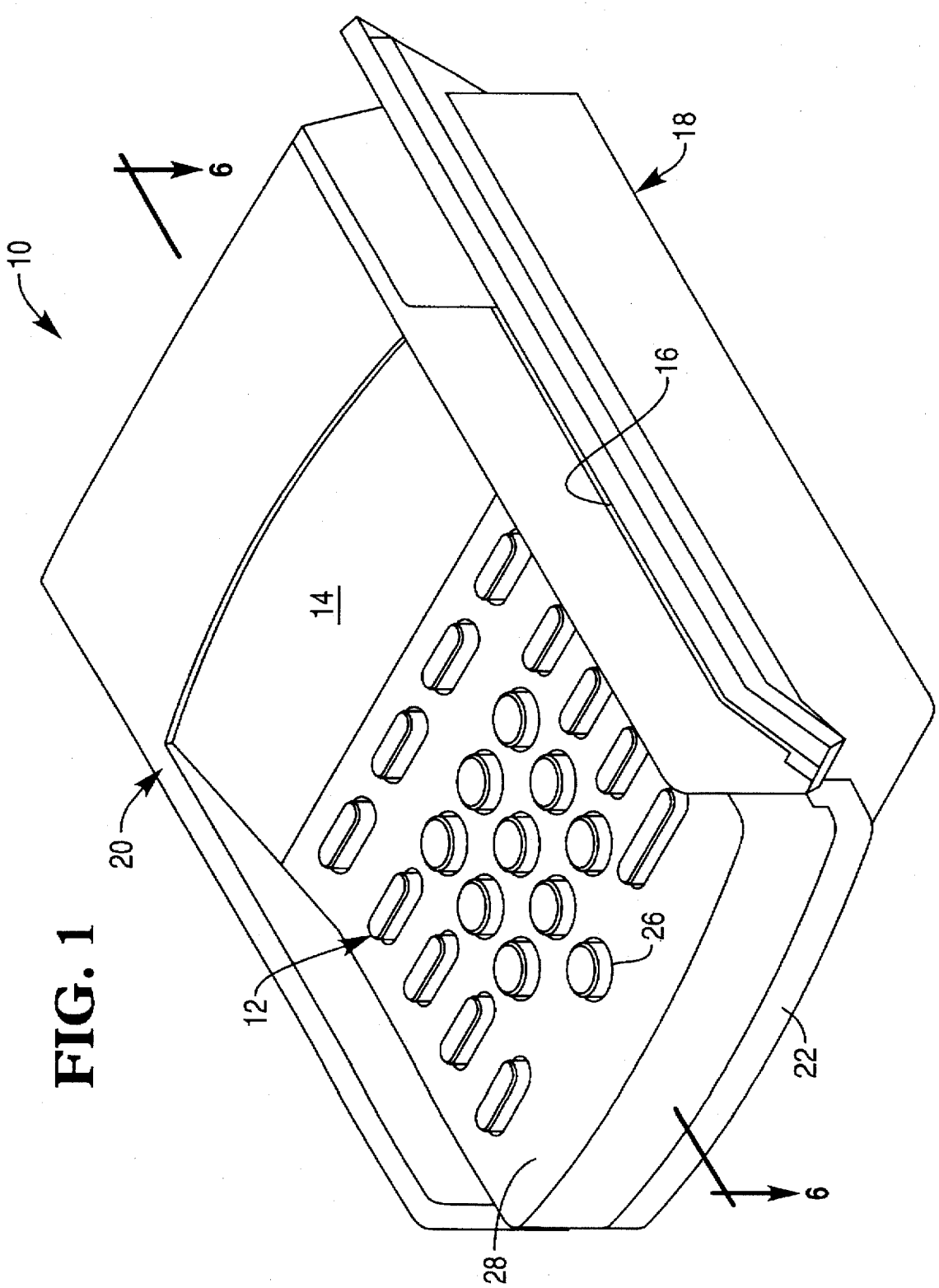
FIG. 1 is a perspective view of a terminal device containing the system of the present invention.

Referring now to FIG. 1, terminal device 10 primarily includes keypad 12 and display 14. Device 10 is shown here with a magnetic stripe reader 16, but other peripherals or combinations of peripherals are also envisioned.

Device 10 further includes housing 18. Housing 18 includes top portion 20 and bottom portion 22. Keypad 14 protrudes through apertures 26 in top surface 28.

Figure 2:
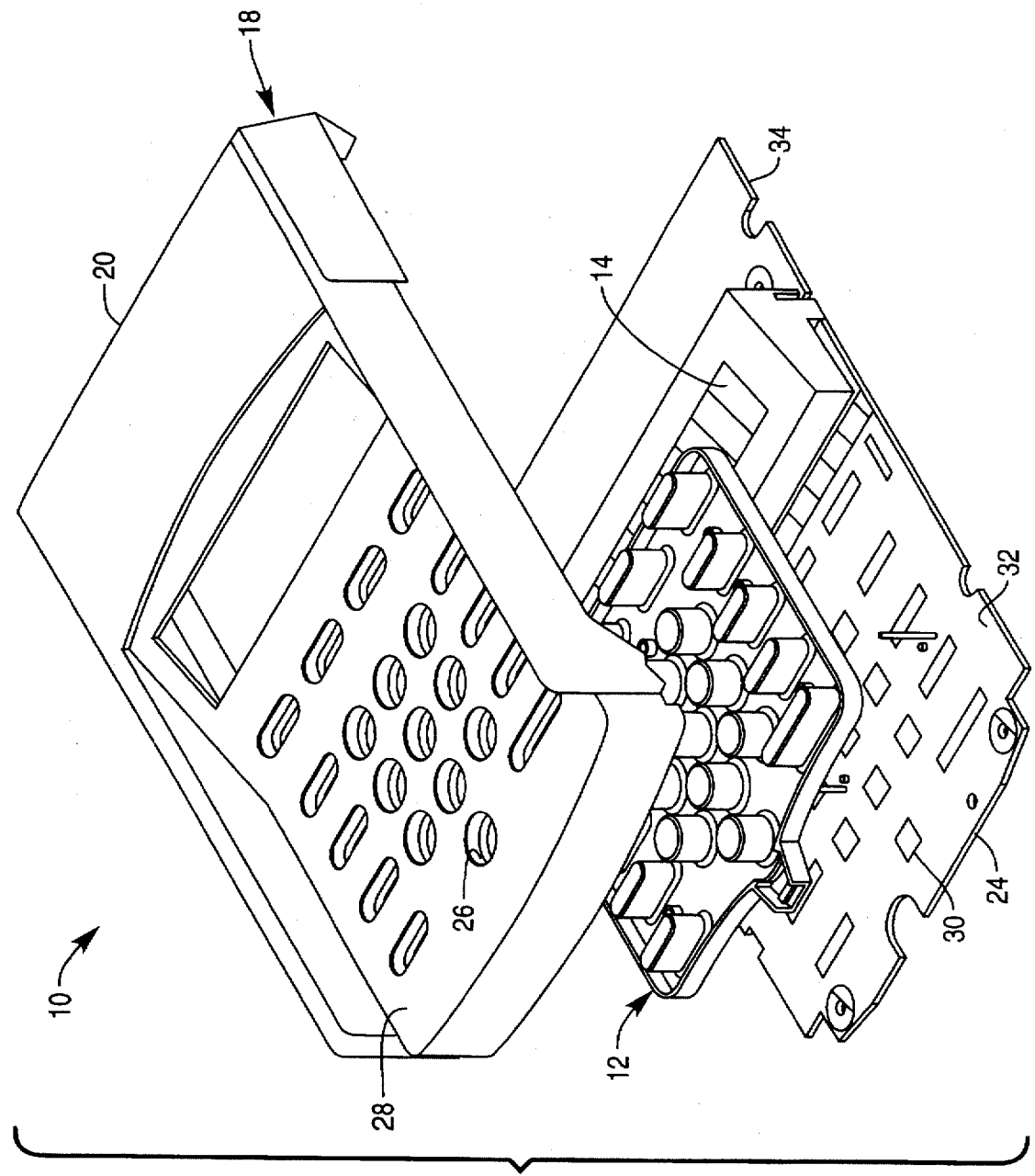
FIG. 2 is a partial exploded view of the terminal device of FIG. 1.

Turning now to FIG. 2, device 10 further includes a printed circuit board 24, which provides a backing plate containing electrical contacts 30 on top surface 32 for each of the keys 62 (FIG. 6) in keypad 12. Electrical contacts 30 are preferably elastometric conductors which are biased in an upwards direction when corresponding keys are not depressed by a user.

Figure 4:
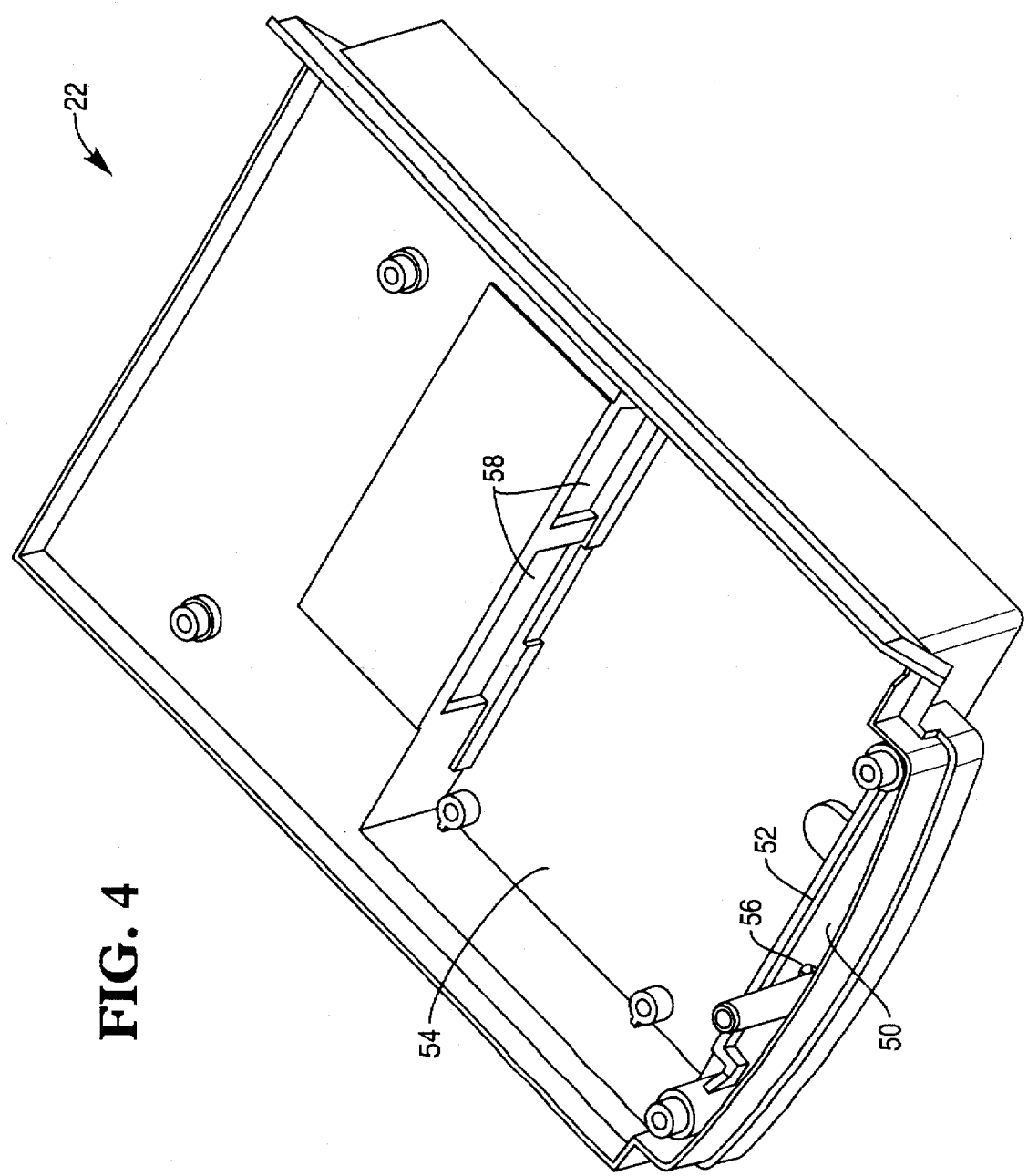
FIG. 4 is a perspective view of the bottom portion of the terminal device in FIG. 1, showing the interior surfaces.

With reference to FIG. 4, provision is also made for mounting control electronics in a bottom cabinet 54 within bottom portion 22. Device 10 is preferably a wireless hand-held payment device, although port connections may be made through apertures 58. Printed circuit board 24 mounts to posts within bottom portion 22 and above bottom cabinet 54.

Display 14 mounts to top surface 32 as well. Control electronics 36 for included peripherals, such as magnetic stripe reader 16, are mounted on printed circuit board 24, either on top surface 32 or bottom surface 34 or both.

Figure 3:
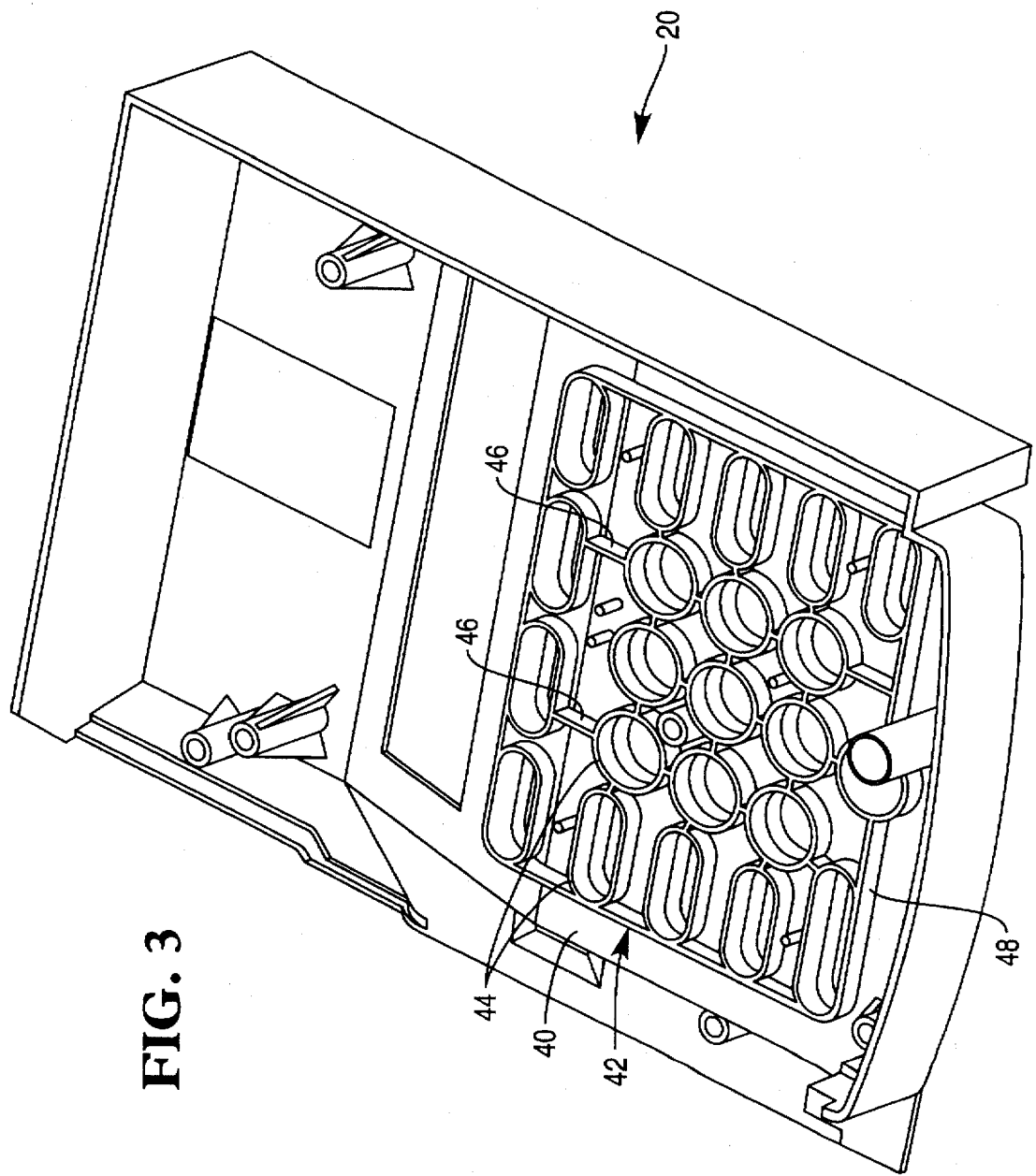
FIG. 3 is a perspective view of the top portion of the terminal device in FIG. 1, showing the interior surfaces.

Turning now to FIG. 3, top portion 20 includes sealing walls 42 on interior side 40. Sealing walls 42 include a first group of walls 44 (aperature walls) surrounding keys 62, a second group of walls 46 (linking or chamber walls) connecting some of the walls 44 in the first group, and a third wall 48 (a type of linking wall also known herein as a "periphery wall") around the perimeter of the keypad area.

Turning now to FIG. 4, bottom portion 22 includes a holding chamber 50 near a leading edge of device 10. Holding chamber 50 collects fluids that are spilled on keypad 26 and somehow get past keypad 22. Holding chamber 50 includes a retaining wall 52 for preventing fluid from entering bottom cabinet 54, and a drain aperture 56 for venting fluids from holding chamber 50 and from device 10.

Figure 5:
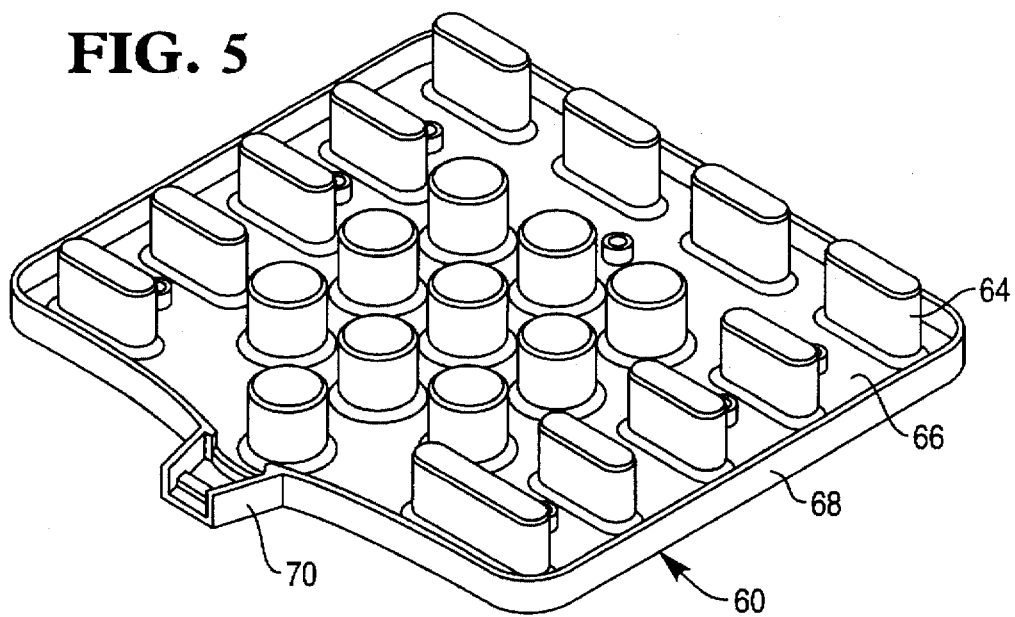
FIG. 5 is a perspective view of a keypad gasket within the system of the present invention.
Figure 6:
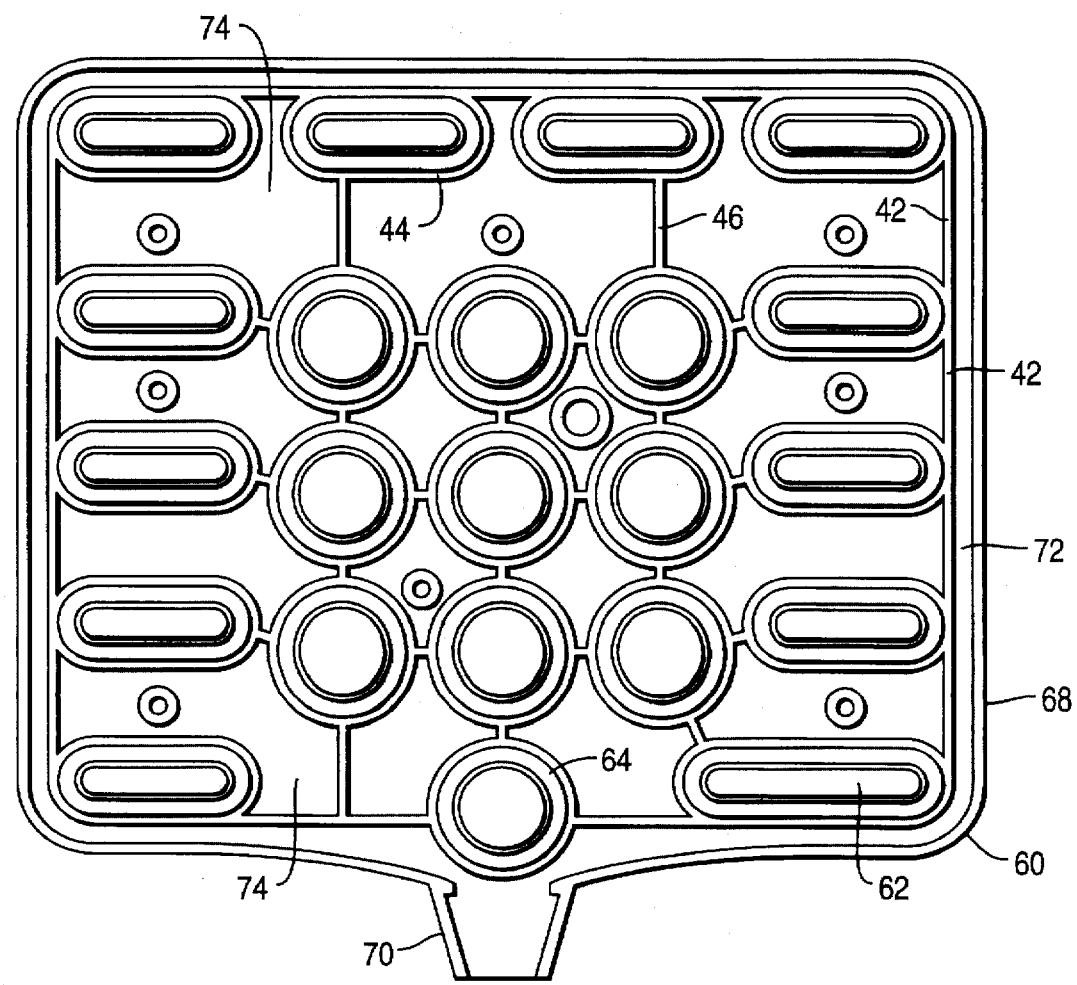
FIG. 6 is a view of the keypad area along line 6—6 in FIG. 1.

Turning now to FIGS. 5 and 6, keypad 12 is preferably a compliant keypad which works in cooperation with electronic contacts 30 (FIG. 2). Keypad 12 includes gasket 60 and keys 62. Gasket 60 is preferably made of synthetic rubber, but any flexible material that has sealing properties may also be employed. Keys 62 are preferably made of plastic, but other materials may also be employed.

Gasket 60 includes primary seal areas 64 enclosing keys 62, a secondary seal area 66 joining the primary seal areas, a wall 68 (flexible periphery wall) around the perimeter of second seal area 66, and a spillway 70.

In operation, primary seal areas 64 work in conjunction with sealing walls 44 around keys 62 to form a first barrier to liquids. Only a minute volume of space, if any, is available for fluids to collect. Fluids on top of surface 28 around keypad 12 are easily removed by turning device 10 upside down and wiping surface 12 with a dry absorbent material.

Secondary seal area 66 works in conjunction with sealing walls 46 to form chambers 74 for trapping fluids that have somehow leaked past primary seal areas 64. The fluids may be removed by first carefully removing top portion 20. Sealing wall 68 prevents the fluids from leaving gasket 60 so that they may be discharged through spillway 70.

Sealing wall 68 traps fluids that have somehow leaked out of chambers 74. Sealing wall 68 works in conjunction with sealing wall 48 to form a channel 72. The fluids flow out of channel 72, through spillway 70, and into holding chamber 50, where they are further isolated by retaining wall 52 before they exhaust through drain aperture 56.

Advantageously, the system of the present invention achieves reliable protection against fluid penetration without costly adhesive-based seals.

Although the present invention has been described with particular reference to certain preferred embodiments thereof, variations and modifications of the present invention can be effected within the spirit and scope of the following claims.

What is claimed is:

1. A system for isolating a fluid from a keypad comprising:
    a flexible gasket member including raised portions, wherein the gasket member overlies a printed circuit board containing elastometric conductors and the raised portions contain keys that impact the elastometric conductors when struck by a user;
    a top cover over the flexible gasket member containing a plurality of apertures defined by aperture walls through which the raised portions protrude;
    wherein the raised portions form a seal between the keys and the aperture walls; and
    a plurality of linking walls which link predetermined aperture walls to form a plurality of chambers on top of the flexible gasket member;
    wherein predetermined linking walls and predetermined portions of predetermined aperture walls form a periphery wall around the aperture walls, wherein the flexible gasket member further comprises a flexible periphery wall around the periphery of the gasket member, and wherein the periphery wall and the flexible periphery wall are separated by a predetermined distance to form a channel.

2. The system as recited in claim 1, wherein the flexible gasket member further comprises:
    a spout portion along one side of the flexible gasket member and coupled to the flexible periphery wall of the channel which vents fluid that has seeped into the channel.

3. A system for isolating a fluid from a keypad comprising:
    a flexible gasket member including raised portions, a flexible periphery wall around the periphery of the gasket member, and a spout portion coupled to the flexible wall; and
    a top cover over the flexible gasket member containing a plurality of apertures defined by aperture walls through which the raised portions protrude, a plurality of linking walls which link predetermined aperture walls, and a periphery wall made up of predetermined linking walls and predetermined portions of predetermined aperture walls;
    wherein the gasket member overlies a printed circuit board containing elastometric conductors and the raised portions contain keys that impact the elastometric conductors when struck by a user;
    wherein the raised portions form a seal between the keys and the aperture walls;
    wherein the linking walls form chambers on top of the flexible gasket member; and
    wherein the periphery wall and the flexible periphery wall are separated by a predetermined distance to form a channel coupled to the spout portion.

4. A system for isolating a fluid from a keypad comprising:
    seals between keys of the keypad and aperture walls defining apertures in a cover member through which the keys protrude;
    a number of chambers around the keys for trapping fluid that has passed by any one of the seals;
    wherein the chambers are defined by chamber walls linking the aperture walls, and a gasket below the chamber walls;
    a channel formed between a periphery wall around the aperture walls and a flexible periphery wall around the gasket for diverting fluid that has passed by any one of the chamber walls; and
    a spout on one side of the gasket and coupled to the flexible periphery wall of the channel which vents fluid that has seeped into the channel.

* * * * *